(12) United States Patent
Pernechele

(10) Patent No.: US 11,293,561 B2
(45) Date of Patent: Apr. 5, 2022

(54) LOW PROFILE SOLENOID VALVE

(71) Applicant: AEREA S.p.A., Turate (IT)

(72) Inventor: Luca Andrea Pernechele, Sesto San Giovanni (IT)

(73) Assignee: AEREA S.p.A., Turate (IT)

( * ) Notice: Subject to any disclaimer, the term of this patent is extended or adjusted under 35 U.S.C. 154(b) by 0 days.

(21) Appl. No.: 17/238,398

(22) Filed: Apr. 23, 2021

(65) Prior Publication Data
US 2021/0332908 A1 Oct. 28, 2021

(30) Foreign Application Priority Data
Apr. 28, 2020 (IT) .................. 102020000009277

(51) Int. Cl.
*F16K 31/06* (2006.01)
*F16K 3/26* (2006.01)
*F16K 31/40* (2006.01)

(52) U.S. Cl.
CPC .......... *F16K 31/0668* (2013.01); *F16K 3/26* (2013.01); *F16K 31/0655* (2013.01); *F16K 31/40* (2013.01); *F16K 31/408* (2013.01)

(58) Field of Classification Search
CPC .... F16K 31/0668; F16K 3/26; F16K 31/0655; F16K 31/40; F16K 31/408
USPC .................................. 251/129.15, 30.01–30.5
See application file for complete search history.

(56) References Cited

U.S. PATENT DOCUMENTS

| | | | | |
|---|---|---|---|---|
| 2,830,743 | A * | 4/1958 | Rimsha | ........... F16K 21/16 222/335 |
| 8,245,730 | B2 * | 8/2012 | Nomichi | ........ F16K 31/0693 137/630.15 |
| 2004/0211477 | A1 | 10/2004 | Ezaki | |
| 2015/0192213 | A1 | 7/2015 | Nomichi | |

FOREIGN PATENT DOCUMENTS

GB    2110795 A    6/1983

OTHER PUBLICATIONS

Italian Search Report and Written Opinion dated Dec. 7, 2020.

* cited by examiner

*Primary Examiner* — John Bastianelli
(74) *Attorney, Agent, or Firm* — Heslin Rothenberg Farley & Mesiti P.C.; Victor A. Cardona, Esq.

(57) ABSTRACT

A piloting section of a solenoid valve is integrated with a valve section and includes a tubular stem having a distal end placed in communication with the atmosphere and axially displaceable by the solenoid from a receded position, in which a shutter of the valve section is kept in a closing condition, to an advanced position corresponding to an opening condition of the shutter. The shutter has a hollow plunger coaxial with a tubular stem and defining an inner thrust chamber in which, in operation, in the receded position of the tubular stem a fluid pressure—which keeps the shutter in closing condition and which is released into the atmosphere—is applied to displace the shutter to the opening condition, through the proximal end of the tubular stem when it is displaced by the solenoid to the advanced position.

3 Claims, 4 Drawing Sheets

LOW PROFILE SOLENOID VALVE

CROSS REFERENCE TO RELATED APPLICATIONS

This application claims priority from Italian Patent Application No. 102020000009277 filed on Apr. 28, 2020, the entire disclosure of which is incorporated herein by reference.

FIELD OF THE INVENTION

The present invention generally relates to solenoid valves of the type comprising a valve section with a shutter suitable to cooperate with a valve seat, and a piloting section including a solenoid actuator to displace the shutter between a closing condition and an opening condition of the valve seat.

STATE OF THE PRIOR ART

In oil-pneumatic systems, the use of two-way electrically controlled valves is widespread. Should the operating pressures be relatively low, or should the required fluid flow rate be low, the actuation can be direct, that is the solenoid acts directly on the shutter which is normally preloaded by a spring in the closing position to ensure the sealing on the valve seat.

On the other hand, should the operating pressures be high or should the flow rates of fluid be significant, the solenoid valves are controlled by a piloting section including the solenoid, capable of creating the force required to open the shutter of the valve section.

Piloting section and valve section are normally physically separated and connected to each other by means of ducts. Since the task of the piloting section is to create a deficiency of forces such to open the valve section, a significant piloting flow rate is not required and hence the connection ducts can also be small. The valve section and the piloting section can be combined according to the available spaces and geometric constraints in the applications of the solenoid valve provided for. In any case, it is always necessary to connect the two sections by means of longer or shorter ducts.

Both with conventional production and with additive production, manufacturing ducts entails complications and requires particular attention, especially in the case of small solenoid valves.

Document US2015/192213 discloses a solenoid valve, wherein the piloting section is integrated with the valve section and it includes a tubular stem having a distal end placed in communication with the atmosphere and a proximal end. The tubular stem can be displaced axially by means of the solenoid from a receded position, wherein the shutter of the valve section is kept in the closing condition, to an advanced position corresponding to the opening condition of the shutter. The shutter is carried by a hollow plunger coaxial with the tubular stem and defining an inner thrust chamber in which, in operation, in the aforementioned receded position of the tubular stem, a fluid pressure—which keeps the shutter in the closing condition and which is released into the atmosphere—is applied to displace the valve stem to the opening condition, through the proximal end of the tubular stem when it is displaced by the solenoid to the aforementioned advanced position.

SUMMARY OF THE INVENTION

The object of the present invention is to provide a solenoid valve in which the piloting section and the valve section coexist in a small overall dimension so as to limit the general dimensions of the solenoid valve, reduce the weight thereof, simplify the interface and ensure high actuation speeds reducing, if not even eliminating, the path of the fluid ducts.

In an embodiment of the solenoid valve, the valve section is fitted into a tank of pressurised fluid provided with the valve seat.

BRIEF DESCRIPTION OF THE DRAWINGS

Further characteristics and advantages of the invention will become more apparent from the detailed description that follows, with reference to the attached drawings, provided purely by way of non-limiting example, wherein.

DETAILED DESCRIPTION OF THE INVENTION

Figure 1:
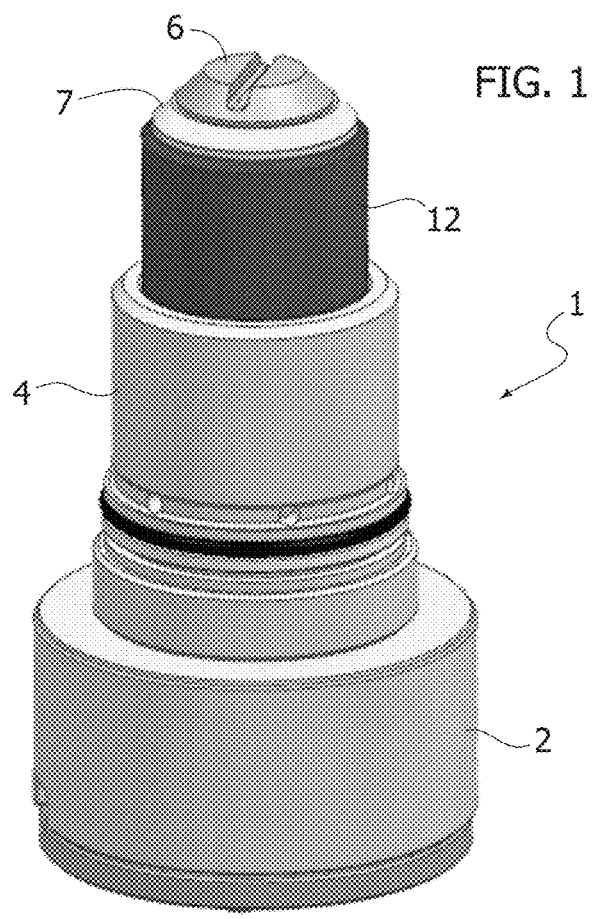
FIG. 1 is a schematic perspective view of an embodiment of the solenoid valve according to the invention.
Figure 2:
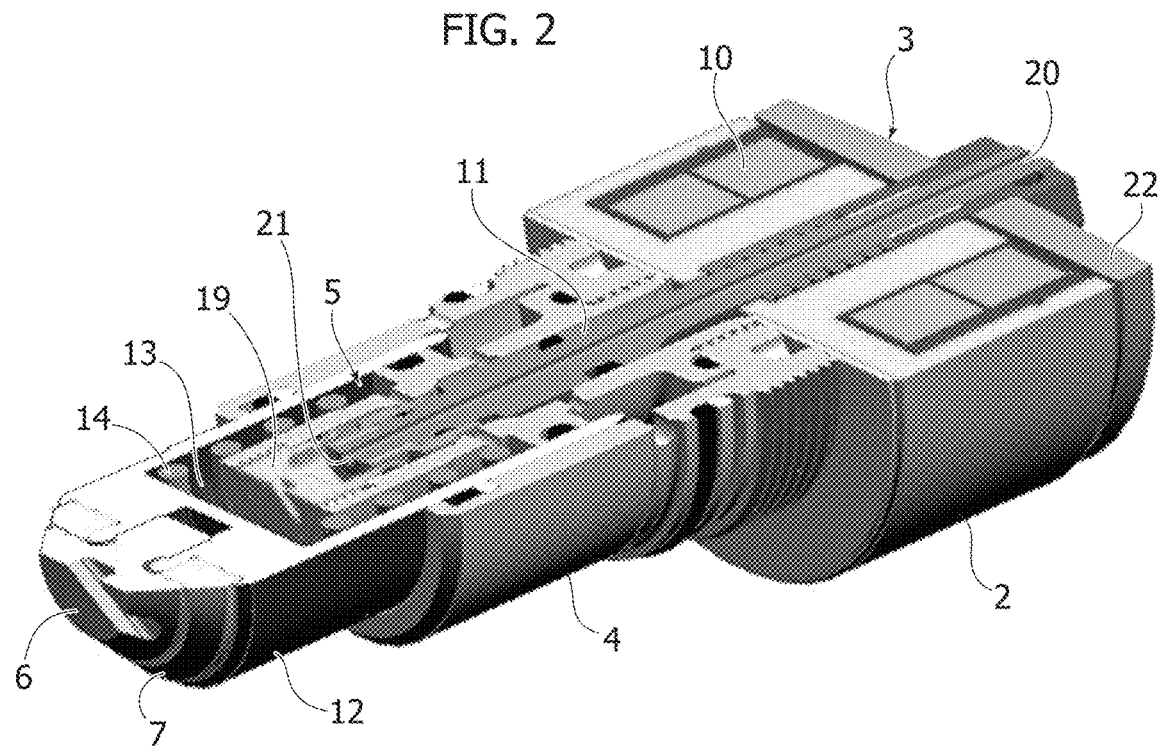
FIG. 2 is a perspective longitudinal sectional view of the solenoid valve of FIG. 1.

Initially referring to FIG. 1, the solenoid valve according to the invention consists of a generally cylindrical body 1 having an enlarged portion 2 which contains a piloting section 3, an intermediate portion 4 which contains a valve section 5, and a movable shutter 7 projecting outside the intermediate portion 4 of the body 1.

The shutter 7 has a conical surface, it is retained axially by a retaining member and it is suitable to cooperate, as described hereinafter, with a valve seat which—in the embodiment described with reference to FIGS. 3, 5 and 7—is formed by an annular outlet edge 9 of a pressurised air tank 8 in which the body 1 of the solenoid valve is integrated.

The piloting section 3 comprises, in a generally conventional manner, a solenoid actuator 10 which actuates an axial stem 11 to control the opening and closing of the shutter 7 so as to control the outflow of the compressed air from the tank 9.

A first distinctive characteristic of the solenoid valve according to the invention consists in the compactness thereof, deriving from the integration between the piloting section 3 and the valve section 5, arranged in axis with respect to each other and with the shutter 7.

The further essential characteristics of the invention lie in the shape of the valve section 5 and of the stem 11.

Figure 3:
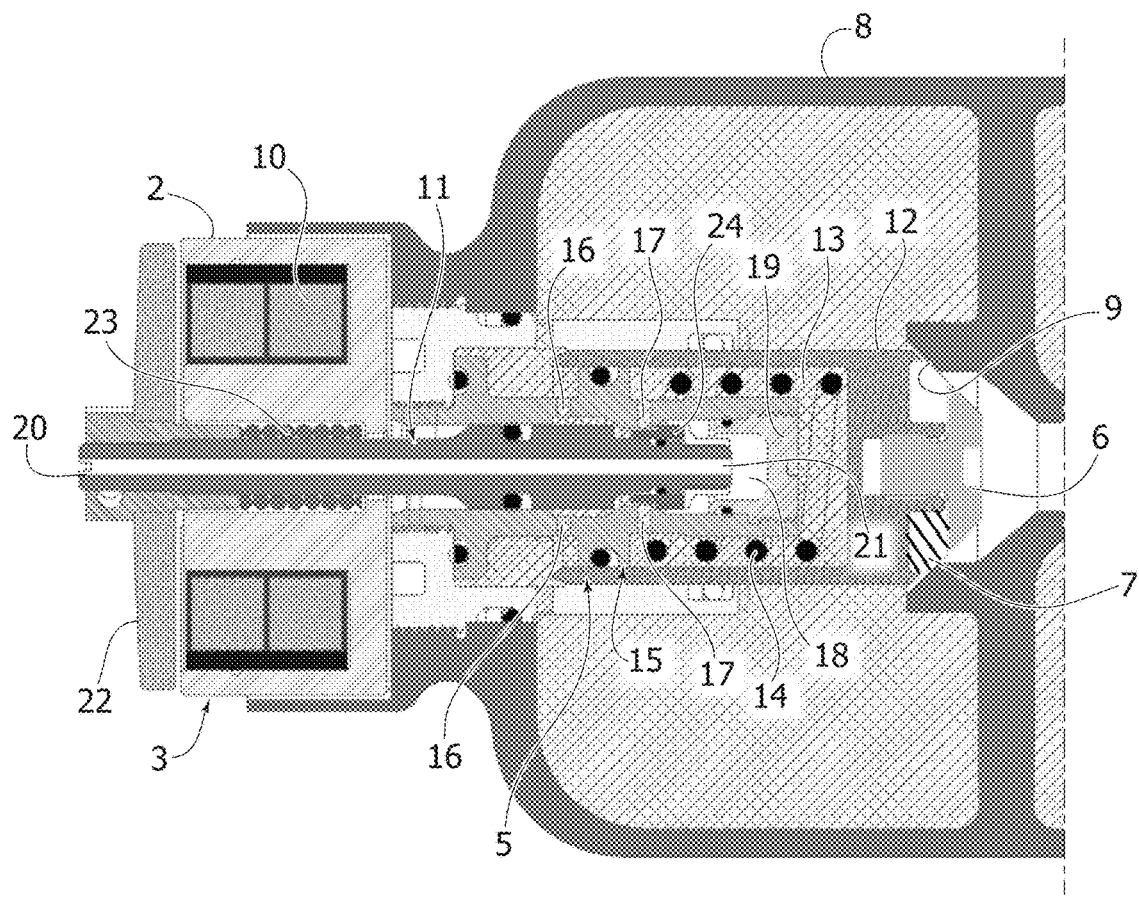
FIG. 3 is a longitudinal sectional view of the solenoid valve fitted to a compressed air tank, shown in a first operating condition (valve closed)
Figure 7:
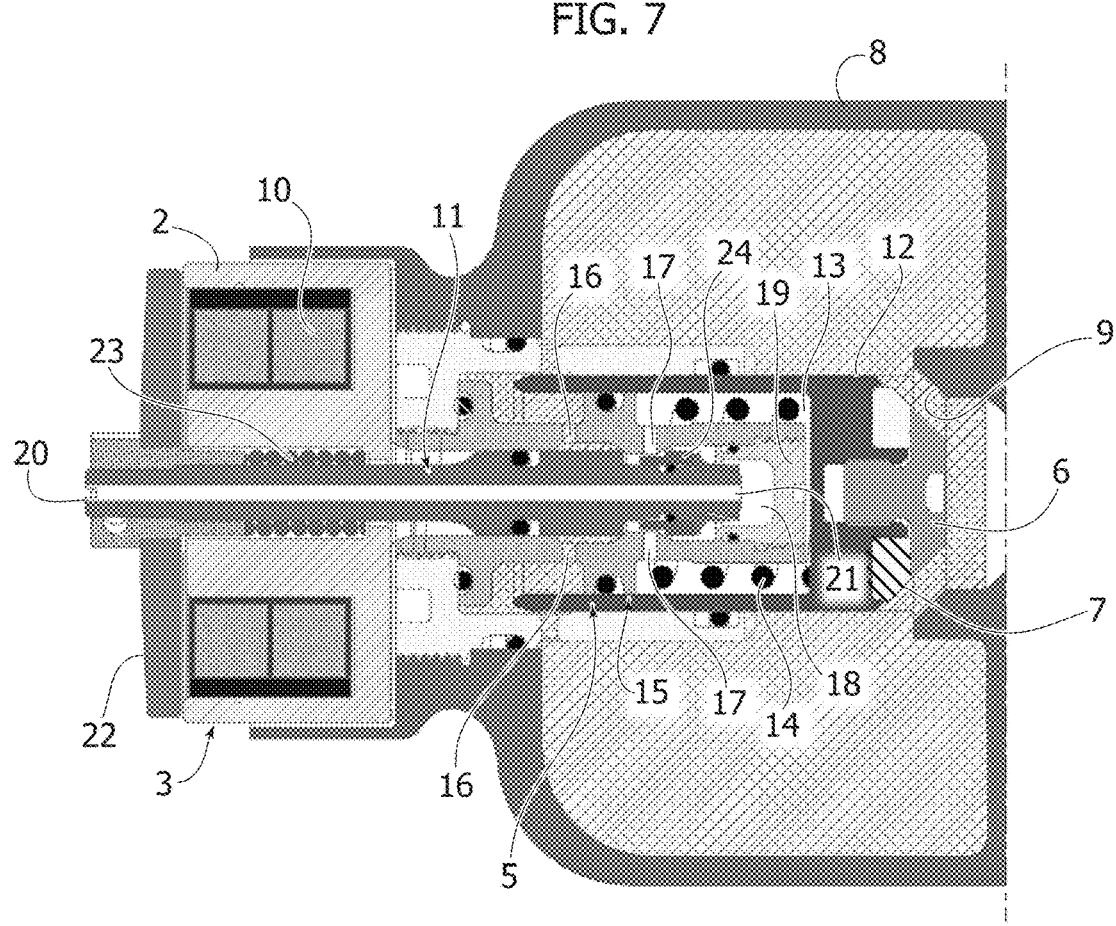
FIG. 7 is a view similar to FIGS. 3 and 5 showing the solenoid valve in a third operating condition (end of opening)

The shutter 7 can be displaced between the advanced fully closing position shown in FIG. 3, in which it sealingly closes the outlet 9 of the tank 8, and a receded fully opening position represented in FIG. 7 to allow the outflow of the compressed air toward the external, toward a member controlled by the solenoid valve. The shutter 7 is carried by a hollow plunger 12 whose cavity forms a thrust chamber 13 which, in the solenoid valve closing position, is placed in communication with the internal of the tank 8: the closing is therefore maintained thanks to the air pressure, together with the thrust of a helical preloading spring 14 interposed—in the thrust chamber 13—between the piston 12 and an annular guide body 15 on whose external the piston 12 is sealingly slidable. This guide body 15 is placed in communication with the internal of the tank 8 through radial passages 16 which in turn are placed in communication with the thrust chamber 13, through further radial passages 17 axially spaced from the passages 16, in the closing position of the shutter 7. In order to displace the shutter 7 toward its receded opening position, the pressure inside the thrust chamber 13 is released to the external, as explained hereinafter, thanks to the fact that the passages 16 are closed and the passages 17 are placed in communication with a secondary chamber 18 formed inside a plug 19 sealingly screwed into the end of the guide body 15 facing the thrust chamber 13.

The opening and closing of the passages 16 and 17 are controlled by the stem 11 actuated by the solenoid 10 of the piloting section 3.

The stem 11 is tubular and it has a distal end 20 open toward the external of the solenoid valve and a proximal end 21 open toward the auxiliary chamber 18, which is therefore placed in communication with the atmosphere.

Figure 4:
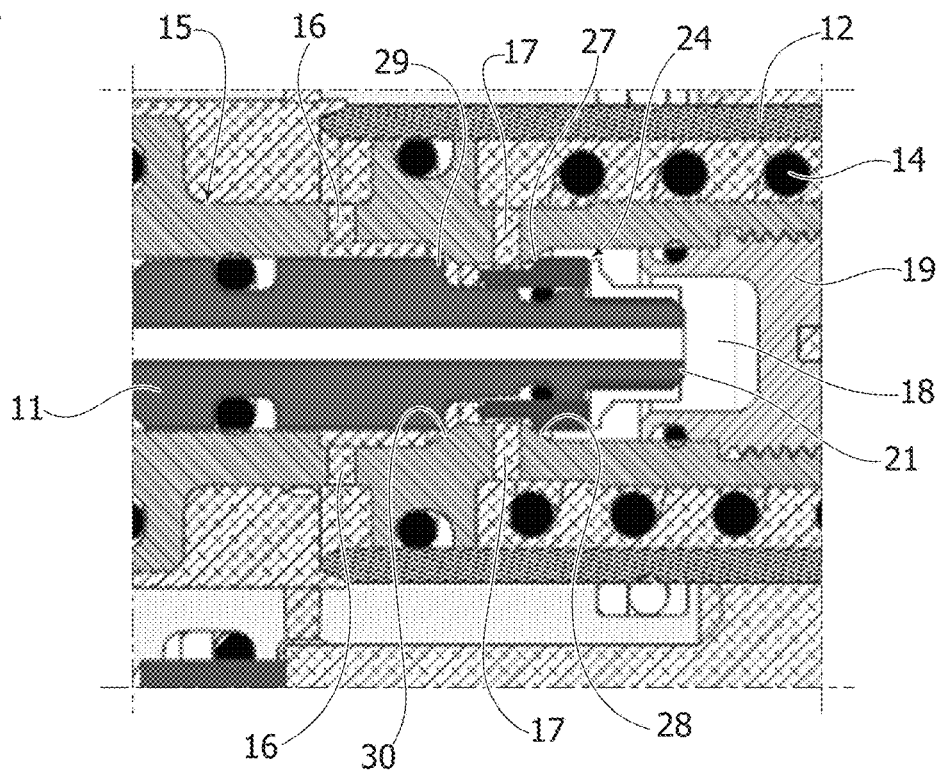
FIG. 4 shows an enlargement of part of FIG. 3.
Figure 6:
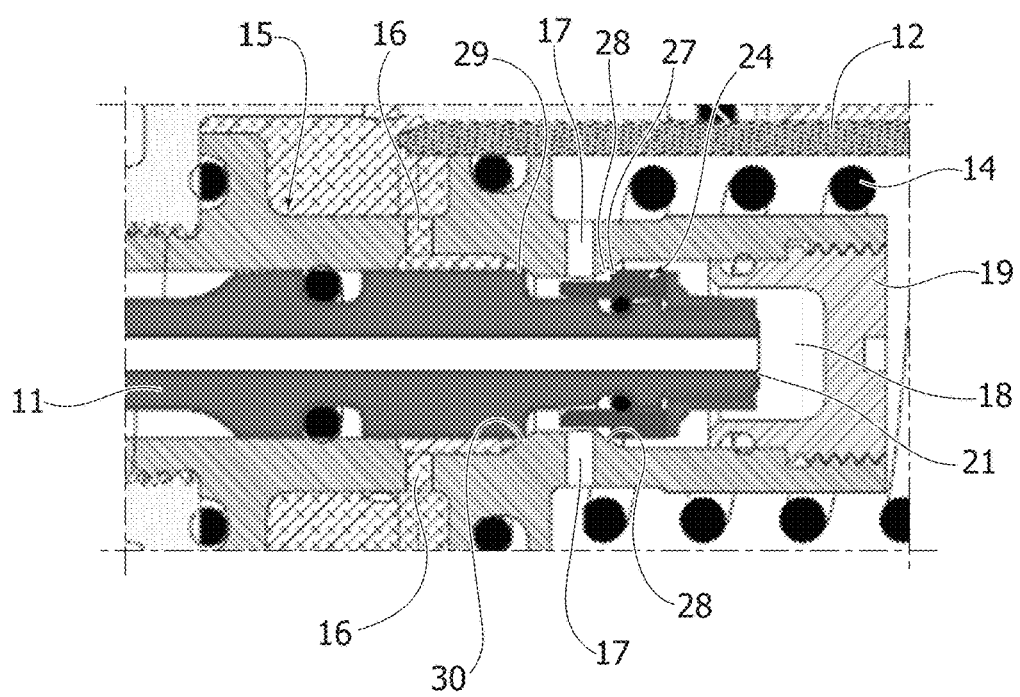
FIG. 6 shows an enlargement of part of FIG. 5.
Figure 8:
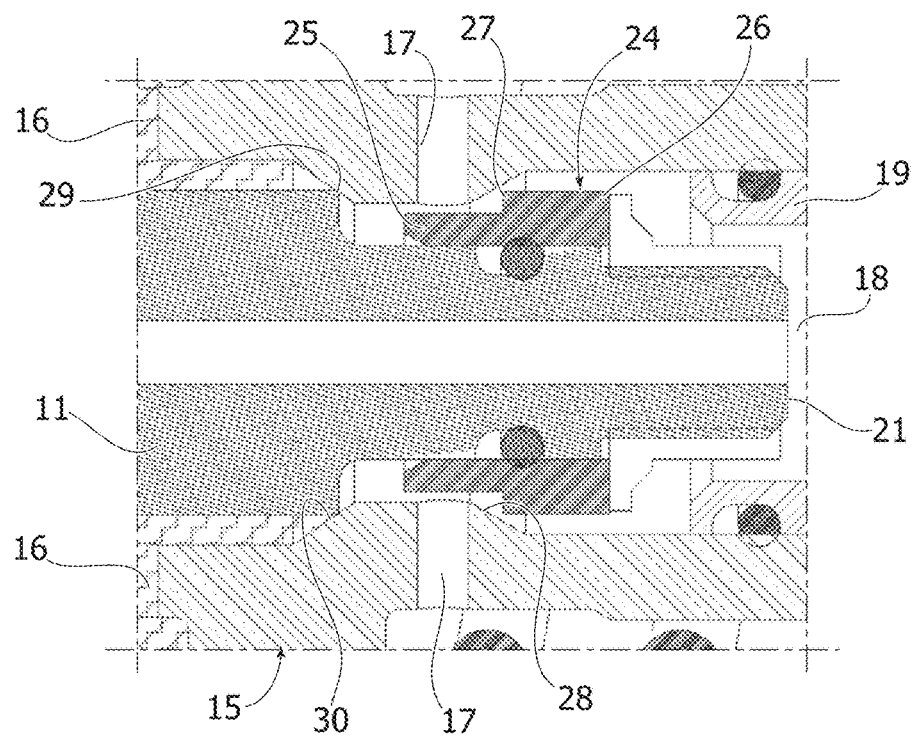
FIG. 8 shows an enlargement of part of FIG. 7.

The tubular stem 11 is sealingly axially slidable in the guide body 15 and it carries, in proximity of the proximal end 21 thereof, a metal annular gasket 24 illustrated in detail in FIGS. 4, 6 and more particularly in FIG. 8. This gasket 24 is in the form of a sleeve having an axial portion with smaller diameter 25 and an axial portion with larger diameter 26 which forms an edge front annular sealing gasket 27 with the axial portion with smaller diameter 25. As clarified hereinafter, the edge seal 27 cooperates with a first inner conical annular surface 28 of the guide body 15.

The tubular stem 11 has a further annular corner front sealing element 29 suitable to cooperate with a second inner conical annular surface 30 of the guide body 15. The conical surfaces 28 and 30 are juxtaposed and located on opposite sides with respect to the radial passages 17.

The distal end 20 of the tubular stem 11 carries an outer stop flange 22 facing the solenoid 10, and a helical thrust spring 23 wound on the tubular stem 11 in proximity of the distal end 20 tends to keep the flange 22 axially spaced from the solenoid 10, in the position represented in FIG. 3. In this condition, the tubular stem 11 is kept, under the action of the spring 23, to the left with respect to the figure. When the solenoid 10 is energised, the flange 22 is displaced to the right with respect to the figure, axially moving the tubular stem 11 to the same extent.

The solenoid valve according to the invention operates as follows.

In the de-energised condition of the solenoid 10, represented in FIG. 3, the spring 23 of the piloting section 3 presses—as mentioned—the tubular stem 11 to the left: the pressurised air contained in the tank 8 acts—through the passages 16 and 17 and the thrust chamber 13—against the hollow plunger 12, pushing it —together with the action of the preloading spring 14 —to the right: the shutter 7 is thus kept hermetically sealed against the annular valve seat 9. As observable in greater detail in FIG. 4, the front sealing 29-30 is open while the front sealing 27-28 is closed. The auxiliary chamber 18 is thus insulated from the passages 17 and it is not placed in communication with the tank 8: it is kept at atmospheric pressure through the tubular stem 11.

Figure 5:
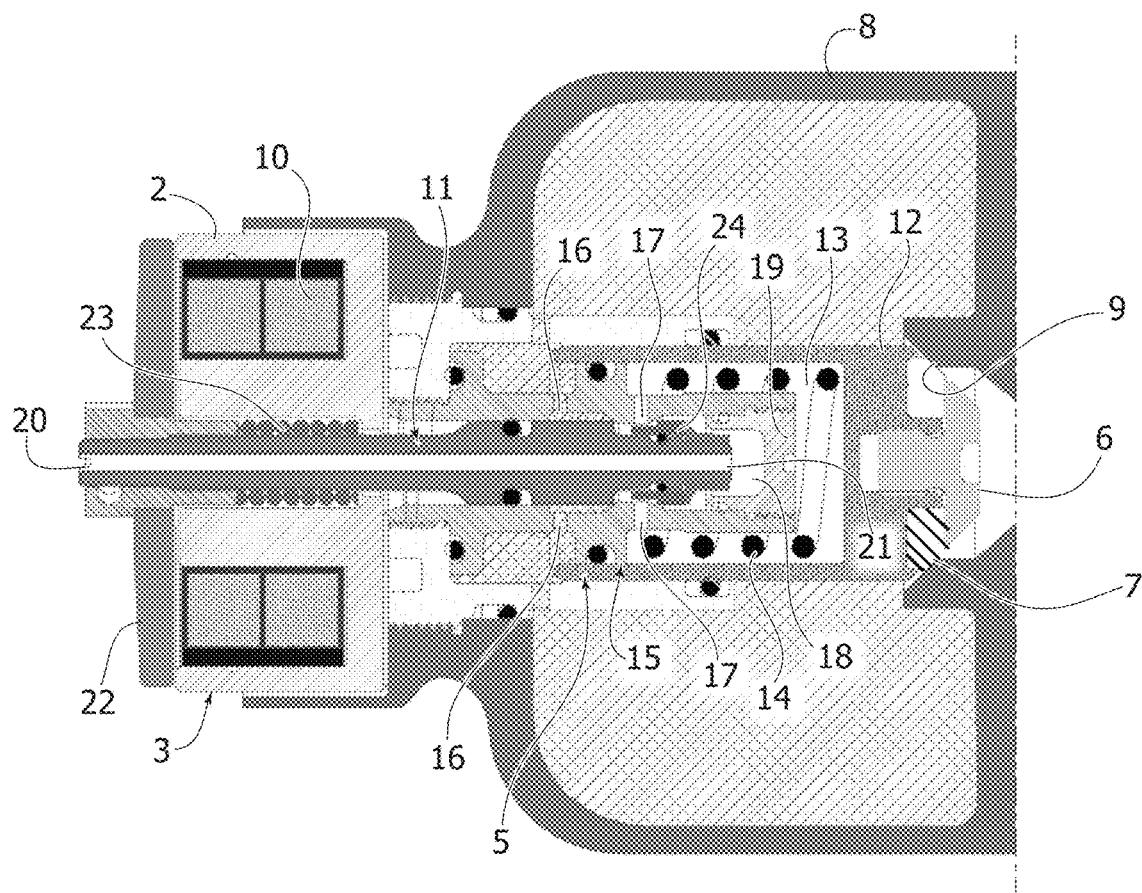
FIG. 5 is a view similar to FIG. 3 showing the solenoid valve in a second operating condition (start of opening)

When the solenoid 10 is energised, the tubular stem 11 starts to move to the right, as illustrated in FIG. 5, so that the front sealing 29-30 starts to close while the front sealing 27-28 starts to open, as is better represented in FIG. 6. Communication between the thrust chamber 13 and the tank 8 through the passages 16 is shut off, while communication between the thrust chamber 13 and the auxiliary chamber is opened through the passages 17. The pressure inside the thrust chamber 18 is therefore released into the atmosphere through the tubular stem 11, and the plunger 12 recedes to the left against the action of the preloading spring 14, allowing the pressurised air contained in the tank 8 to act on the conical surface 7 of the shutter 7, which moves away from the valve seat 9.

At the end of the stroke of the tubular stem 11 to the right, determined by the stop of the flange 22 against the solenoid 10, the front sealing 29-30 is fully closed and the front sealing 27-28 is fully open, as observable in FIG. 8. The plunger 12 has completed the stroke thereof to the left and the solenoid valve is thus fully open, as illustrated in FIG. 7.

In light of the above, it will be clear that besides being particularly compact and small in terms of overall dimension and weight, thanks to the integration of the piloting section with the valve section, the solenoid valve according to the invention considerably simplifies the interface between the two sections thus eliminating connection ducts and thus also ensuring a significantly increased actuation speed, that is the opening speed, with respect to conventional solenoid valves. Therefore, the solenoid valve according to the invention can be particularly advantageously applied in the aeronautical and aerospace industry in which the reduction in size and weight together with the rapidity of actuation are particularly important.

Naturally, the construction details of the solenoid valve may vary widely with respect to what has been described and illustrated without departing from the scope of protection of the invention as defined in the claims that follow. Thus, although the solenoid valve has been described with reference to a pneumatic example, it is equally advantageously applicable in the hydraulic industry.

The invention claimed is:

1. Solenoid valve comprising:
   a valve section with a shutter designed to cooperate with a valve seat, and a piloting section including a solenoid actuator for moving the shutter between a closing condition and an opening condition of the valve seat, wherein the piloting section is integrated with the valve section and includes a tubular stem having a distal end placed in communication with the atmosphere and a proximal end,
   said tubular stem being axially displaceable by the solenoid from a receded position, in which the shutter of the valve section is kept in the closing condition, to an advanced position corresponding to the opening condition of the shutter;
   said shutter being carried by a hollow plunger coaxial with the tubular stem and defining an inner thrust chamber within which, in operation, in said receded position of the tubular stem a fluid pressure is applied which maintains the shutter in said closing condition and which is released into the atmosphere, so as to displace the shutter to said opening condition, through the proximal end of the tubular stem when the tubular stem is displaced by the solenoid to said advanced position,
   a hollow guide body within which said tubular stem is axially movable and which is formed with radial passages placed in communication with said fluid pressure; and valve means between said tubular stem and said guide body so as to hold or respectively discharge said fluid pressure relative to said thrust chamber.

2. Solenoid valve according to claim 1, wherein said valve means are of the axial front seal type.

3. Solenoid valve according to claim 1, wherein the valve section is fitted into a tank of pressurised fluid provided with said valve seat.

\* \* \* \* \*